R. B. PEARCY.
WAGON TONGUE.
APPLICATION FILED OCT. 3, 1916.
1,217,627.
Patented Feb. 27, 1917.
2 SHEETS—SHEET 1.
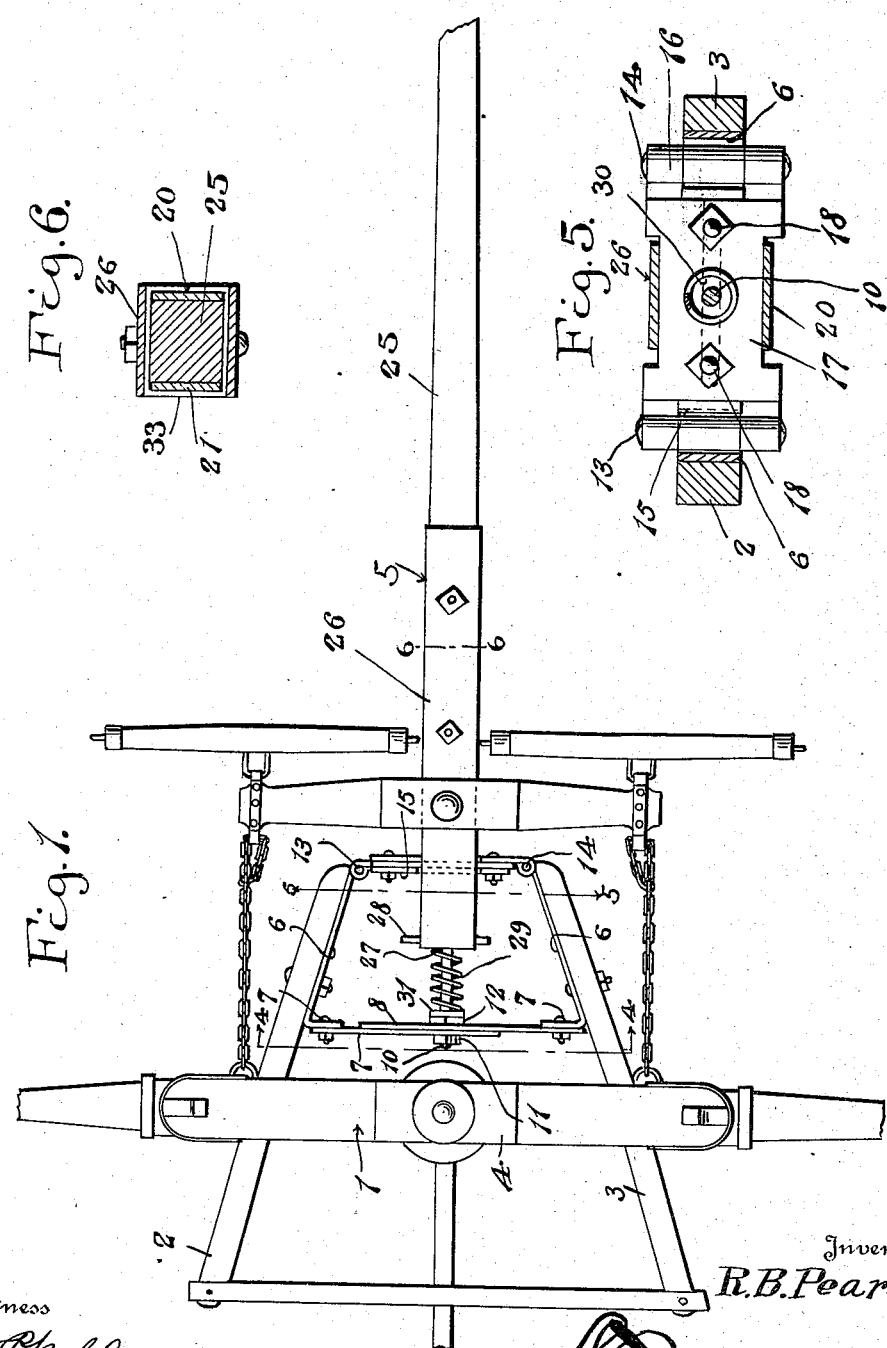
Witness
J. P. Wahler
Robt Meyer
Inventor
R. B. Pearcy
By
Attorney

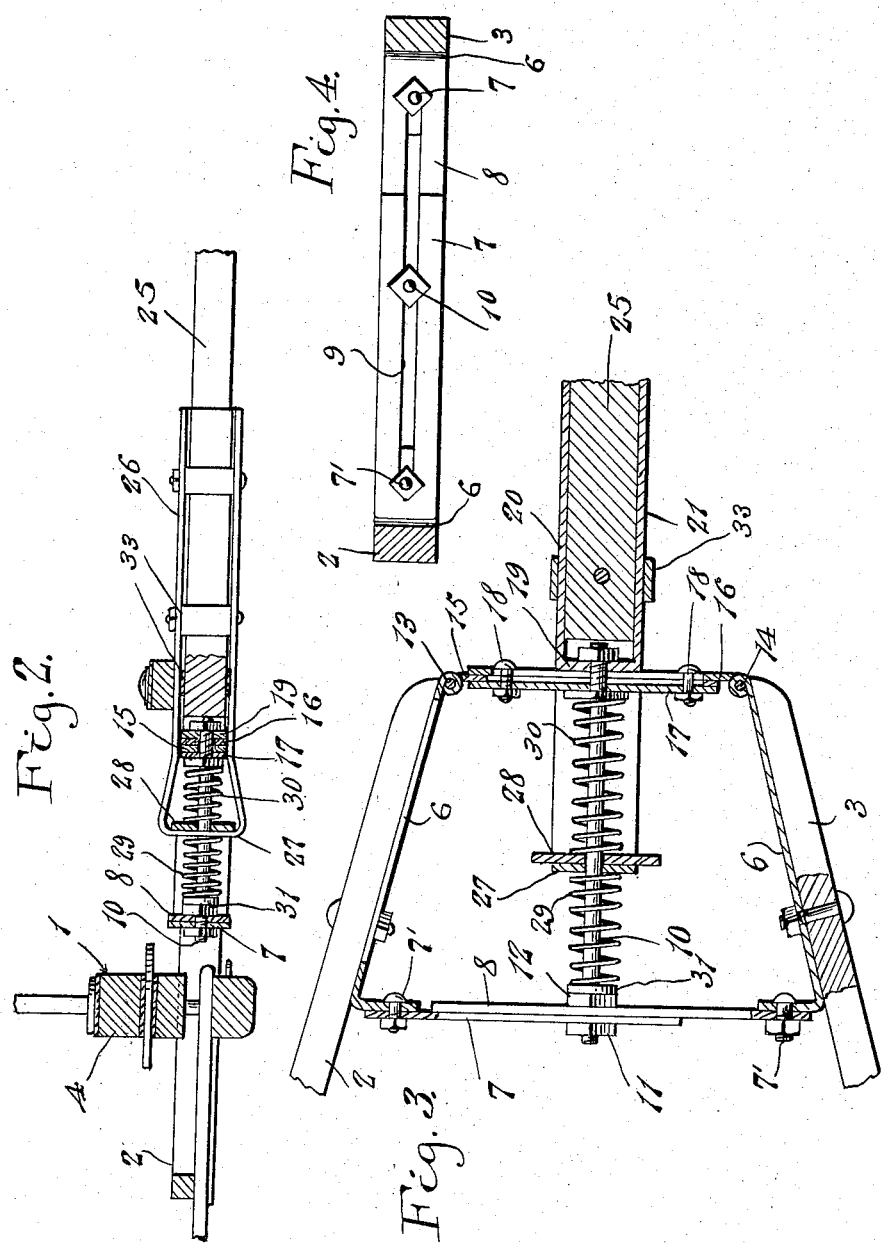

UNITED STATES PATENT OFFICE.

ROBERT B. PEARCY, OF THALIA, TEXAS.

WAGON-TONGUE.

1,217,627.

Specification of Letters Patent. Patented Feb. 27, 1917.

Application filed October 3, 1916. Serial No. 123,589.

*To all whom it may concern:*

Be it known that I, ROBERT B. PEARCY, a citizen of the United States, residing at Thalia, in the county of Foard and State of Texas, have invented certain new and useful Improvements in Wagon-Tongues; and I do hereby declare the following to be a full, clear, and exact description of the invention, such as will enable others skilled in the art to which it appertains to make and use the same.

This invention relates to a wagon or vehicle tongue, or pole and the primary object of the invention is to provide a vehicle tongue which is constructed for relieving the horses or draft animals hitched thereto of the shock caused by the flopping of the tongue when the wagon or vehicle is traveling over rough places and also to provide a tongue which is adjustable so that it may be attached to any ordinary vehicle.

Another object of this invention is to provide a wagon tongue structure as specified which includes an attaching bracket structure including a pair of hingedly connected side arms which have their inner ends adjustably connected for lateral adjustment with respect to each other for attachment to the front end of the hounds of any ordinary wagon or vehicle, and to slidably connect the tongue proper to said attaching arms, and further to provide coil springs which engage the end of the tongue structure for yieldably supporting it to permit the tongue to move a limited distance independently of movement of the wagon for preventing the transmission of shock or uneven movement of the wagon to the tongue and consequently to the horses or draft animals pulling the vehicle or wagon.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which :—

Figure 1 is a top plan view of the improved vehicle tongue showing the same attached to a portion of the front running gear structure of a wagon.

Fig. 2 is a vertical section through the tongue.

Fig. 3 is a horizontal section through a fragment of a tongue structure.

Fig. 4 is a section on the line 4—4 of Fig. 1.

Fig. 5 is a section on the line 5—5 of Fig. 1, and

Fig. 6 is a section on the line 6—6 of Fig. 1.

Referring more particularly to the drawings, 1 designates a fragment of the front running gears of a wagon or vehicle of any ordinary construction, which includes the hounds 2 and 3 as is ordinary in the construction of this type of vehicle.

The tongue structure generically indicated by the numeral 5 is attached to the inner surfaces of the forward ends of the hounds by attaching plates 6, which plates have their rear ends connected through the medium of bolts or the like to plates 7 and 8 which are adapted for extending parallel to the bolsters indicated at 4 of the front running gear structure 1 and for connecting and bracing the attaching bars 6. The bars 7 and 8 are provided with longitudinally extending slots 9 through which a bolt 10 extends. Nuts 11 and 12 are mounted upon the bolt 10 upon opposite sides of the plates 7 and 8 for clamping these plates in firm abutting engagement with each other and for holding them rigidly in position, after the proper distance between the attaching bars 6 has been made by the sliding adjustment between the bars 7 and 8. The attaching bars 6 are hingedly connected as shown at 13 and 14 to plates 15 and 16 respectively. The plates 15 and 16 are in turn connected to a plate 17 by bolts or analogous fastening devices 18. The bolt 10 extends through the plates 17, 15, 16 and through the bight portion 19 of a substantially U-shaped plate 20. The bolt 10 connects the U-shaped member 20 rigidly to the plate 16, as clearly shown in Fig. 3 of the drawings. The U-shaped member 20 is positioned so that its sides or legs 21 extend vertically.

The tongue proper 25 has a substantially U-shaped bar 26 attached to its rear end, which bar has its sides resting upon the top and bottom respectively of the tongue 25, as clearly shown in Fig. 2 of the drawings. The substantially U-shaped bar 26 projects inwardly from the end of the tongue 25 and the bolt 10 extends through the bight portion 27 of the same. A plate 28 is mounted upon the bolt 10 and engages the inner surface of the bight portion 27. Coil springs 29 and 30 are coiled about the bolt 10. The forward end of the spring 29 engages the rear surface of the bight portion 27, while the rear end of this spring engages a collar 31 which is mounted upon the bolt 10. The rear end of the spring 30 engages the forward surface of the plate 28, while the forward end of the spring engages the rear surface of the plate 17. The springs 29 and 30 yieldably connect the tongue 25 and the U-shaped bar 26 to the bolt 10, and consequently to the attaching plates 6 so as to permit of a limited longitudinal movement of the tongue independent of movement of the attaching plates 6 and of the running gears of the wagon. The tongue 25 has straps 33 attached thereto which extend across the top and bottom of the tongue and along the outer sides of the legs 21 of the U-shaped member 20 for slidably connecting the tongue 25 to the U-shaped member, which member guides the slidable movement of the tongue 25.

From the foregoing description taken in connection with the accompanying drawings the advantages of construction and of the method of operation of the improved wagon tongue will be readily apparent to those skilled in the art to which this invention appertains and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a vehicle tongue structure, the combination, with an attaching structure including a pair of adjustably connected bracing plates, attaching plates connected to said bracing plates, plates hingedly connected to the forward ends of said attaching plates, of a substantially U-shaped member connected to said hinged plates, a tongue slidably supported by said U-shaped member, a bolt connected to said bracing plates and said hinged plates, a substantially U-shaped member connected to said tongue and having its bight portion slidably connected to said bolt, and springs coiled about said bolt and engaging said bight portion.

2. In a vehicle tongue structure, the combination with an attaching structure, of a substantially U-shaped member connected to said attaching structure, a tongue slidably connected to said U-shaped member, a second substantially U-shaped member attached to said tongue, a bolt carried by said attaching structure and extending slidably through the bight portion of said second U-shaped member, springs coiled about said bolt and engaging said bight portion for yieldably holding said tongue against longitudinal movement.

In testimony whereof I affix my signature in presence of two witnesses.

ROBT. B. PEARCY.

Witnesses:
  T. C. HOUCHIN,
  J. L. SHULTZ.

Copies of this patent may be obtained for five cents each, by addressing the "Commissioner of Patents, Washington, D. C."